(12) United States Patent
Baes et al.

(10) Patent No.: US 12,114,609 B2
(45) Date of Patent: Oct. 15, 2024

(54) INTEGRATED WEED SEED MILL AND CHOPPER FOR COMBINE HARVESTER

(71) Applicant: CNH Industrial America LLC, New Holland, PA (US)

(72) Inventors: Frederik Baes, Reninge (BE); Charlotte van de Wege, Zulte (BE)

(73) Assignee: CNH Industrial America LLC, New Holland, PA (US)

( * ) Notice: Subject to any disclaimer, the term of this patent is extended or adjusted under 35 U.S.C. 154(b) by 665 days.

(21) Appl. No.: 17/381,428

(22) Filed: Jul. 21, 2021

(65) Prior Publication Data

US 2023/0026898 A1 Jan. 26, 2023

(51) Int. Cl.
*A01F 12/40* (2006.01)
*A01D 41/12* (2006.01)

(52) U.S. Cl.
CPC .......... *A01F 12/40* (2013.01); *A01D 41/1243* (2013.01)

(58) Field of Classification Search
CPC ............................ A01F 12/40; A01D 41/1243
See application file for complete search history.

(56) References Cited

U.S. PATENT DOCUMENTS

| | | |
|---|---|---|
| 5,873,226 A | 2/1999 | McLeod |
| 8,152,610 B2 * | 4/2012 | Harrington ........... B02C 13/288 460/111 |
| 8,585,475 B2 | 11/2013 | Isaac et al. |
| 8,992,294 B2 | 3/2015 | Dilts et al. |
| 9,313,949 B2 | 4/2016 | Knierbein et al. |
| 10,004,176 B2 | 6/2018 | Mayerle |
| 10,244,685 B2 | 4/2019 | Matousek et al. |
| 10,314,232 B2 | 6/2019 | Isaac et al. |
| 10,375,885 B2 | 8/2019 | Puryk et al. |
| 2017/0034997 A1 * | 2/2017 | Mayerle .................. A01F 12/48 |
| 2019/0174677 A1 | 6/2019 | Ricketts et al. |
| 2020/0296896 A1 | 9/2020 | Mayerle |
| 2021/0022289 A1 * | 1/2021 | Berry .................... B02C 13/284 |

FOREIGN PATENT DOCUMENTS

| | | | | |
|---|---|---|---|---|
| AU | 3878101 A | * | 10/2001 | |
| AU | 2019202177 A1 | * | 10/2019 | |
| EP | 3092891 A1 | * | 11/2016 | ............. A01D 41/00 |
| WO | WO-2020181385 A1 | * | 9/2020 | ......... A01D 41/1243 |

OTHER PUBLICATIONS

International Search Report and Written Opinion for International Application No. PCT/US2022/037603 dated Nov. 2, 2022 (11 pages).

* cited by examiner

*Primary Examiner* — Alicia Torres
*Assistant Examiner* — Ashley A Kaercher
(74) *Attorney, Agent, or Firm* — Peter K. Zacharias; Rebecca L. Henkel; Rickard K. DeMille (57) ABSTRACT

A residue handling system for an agricultural harvester includes a chopper that is positionable within a straw hood of the combine harvester and a seed mill that is mounted directly to the chopper. The chopper has projecting elements for chopping straw within the straw hood as the chopper rotates. The seed mill includes a rotatable rotor that is at least partially positioned within a concave. The rotor and the chopper are connected or unitized so as to rotate together.

20 Claims, 6 Drawing Sheets

INTEGRATED WEED SEED MILL AND CHOPPER FOR COMBINE HARVESTER

FIELD OF THE INVENTION

The present invention relates to agricultural harvesters. More specifically, the present invention relates to an integrated weed seed mill and chopper for a combine harvester.

BACKGROUND OF THE INVENTION

As is described in U.S. Pat. No. 10,314,232 to CNH America LLC (the '232 Patent), which is incorporated by reference in its entirety and for all purposes, an agricultural harvester known as a "combine" is historically termed such because it combines multiple harvesting functions with a single harvesting unit, such as picking, threshing, separating and cleaning. The separating system of the combine directs the non-grain material to a residue system. The residue system distributes the non-grain material through a chopper, a spreader, and/or a windrow chute before it is distributed onto the field.

Crop residue that is discharged onto fields often contains lost grain and seeds, including shrunken crop seeds and weed seeds. Most or all of the seeds are in the chaff that exits the cleaning system. Many of the seeds are not destroyed and remain viable after exiting the combine. Viable seeds can germinate and sprout in the field, resulting in the spread of undesired weeds and potential crop disease. Weeds that sprout are typically killed by tillage or chemical treatment, however, weed control measures such as these are costly. Moreover, these weed control measures require additional equipment passing over the field, which can increase soil compaction and adversely impact the condition of the field.

The '232 Patent discloses a weed seed mill configured for destroying the weed seeds through shearing forces during the harvesting process. A weed seed mill may also be referred to herein or in the art as a seed mill, seed processor, chaff mill, chaff mill assembly, or chaff processor. The seed mill is configured to receive crop residue from a cleaning system of the combine and destroy or damage seeds through shearing forces, so that when the seeds exit the combine, the seeds are no longer viable and able to germinate.

Seed mills are typically powered by a drive system including a shaft mounted pulley. The seed mill pulley is driven by a belt that is connected to a drive for the chopper of the combine, and the drive for the chopper is indirectly connected to, and powered by, the engine of the combine (for example). Due to the rearward location of the seed mill in the combine, the seed mill pulley is positioned outside of the straw hood of the combine and either in or near a rear wheel well of the combine. For combines having steerable rear wheels, such positioning of the pulley presents an obstacle because the pulley or the belt that is mounted to that pulley could interfere with the steered rear wheels. While it is possible to limit the turning radius of the steerable rear wheels, such a modification may be viewed as an undesirable restriction on the maneuverability of the combine. Also, powering the seed mill by way of an additional belt connected to the drive for the chopper adds cost, weight and other complexities.

In view of the foregoing, it would be desirable to integrate a seed mill with the chopper of the combine. Such a solution would dispense with a separate seed mill pulley and belt described above.

SUMMARY OF THE INVENTION

According to one aspect of the invention, a residue handling system for an agricultural harvester includes a chopper that is positionable within a straw hood of the combine harvester and a seed mill that is mounted directly to the chopper. The chopper has projecting elements for chopping straw within the straw hood as the chopper rotates. The seed mill includes a rotatable rotor that is at least partially positioned within a concave. The rotor and the chopper are connected or unitized so as to rotate together.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the crop flow stream arrows shown in FIGS. 3-5.

Figure 1:
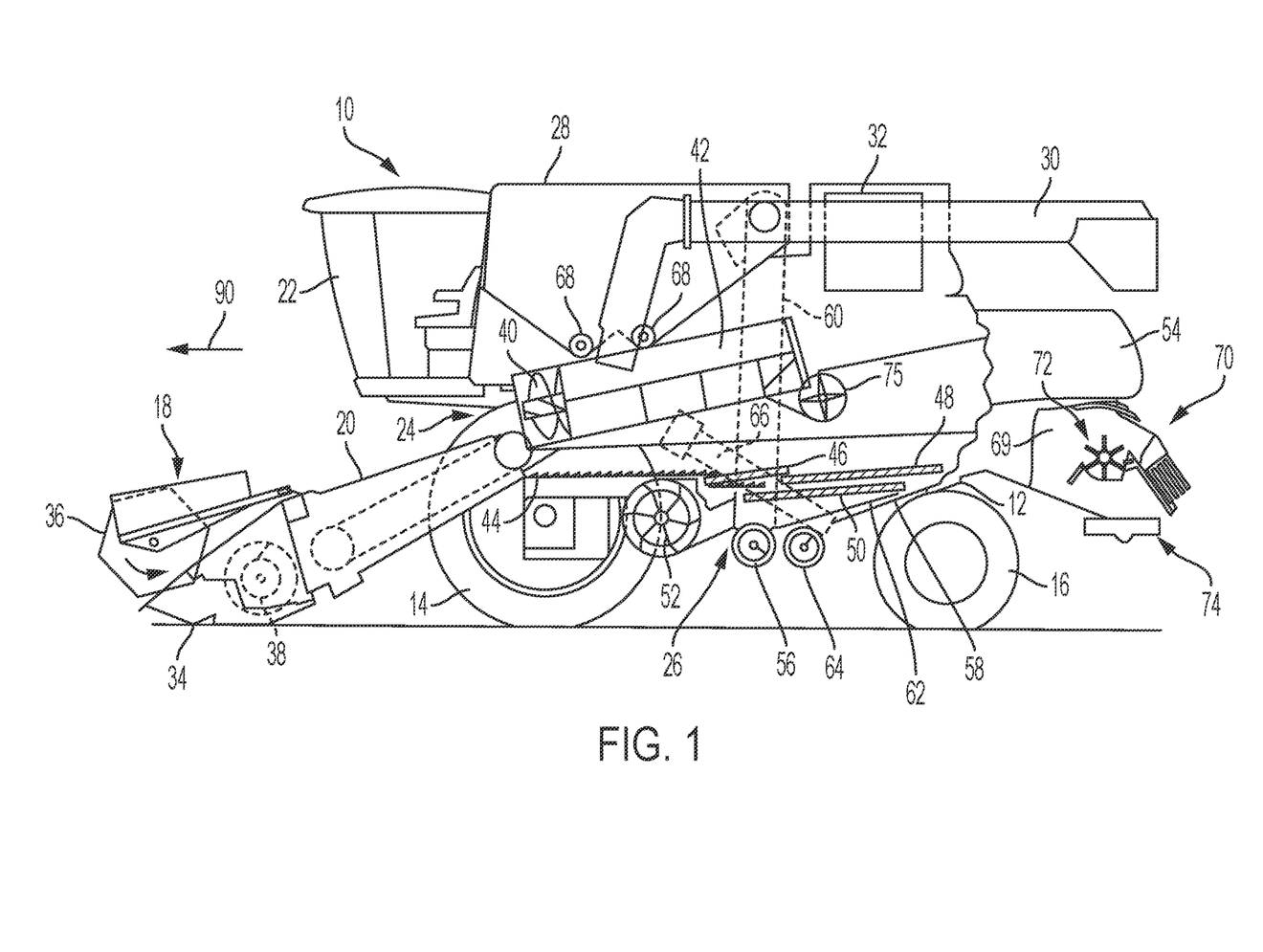
FIG. 1 is a side view of an embodiment of an agricultural harvester in the form of a combine illustrating the residue handling system of the present invention in a cutout view toward the rear of the harvester.
Figure 2:
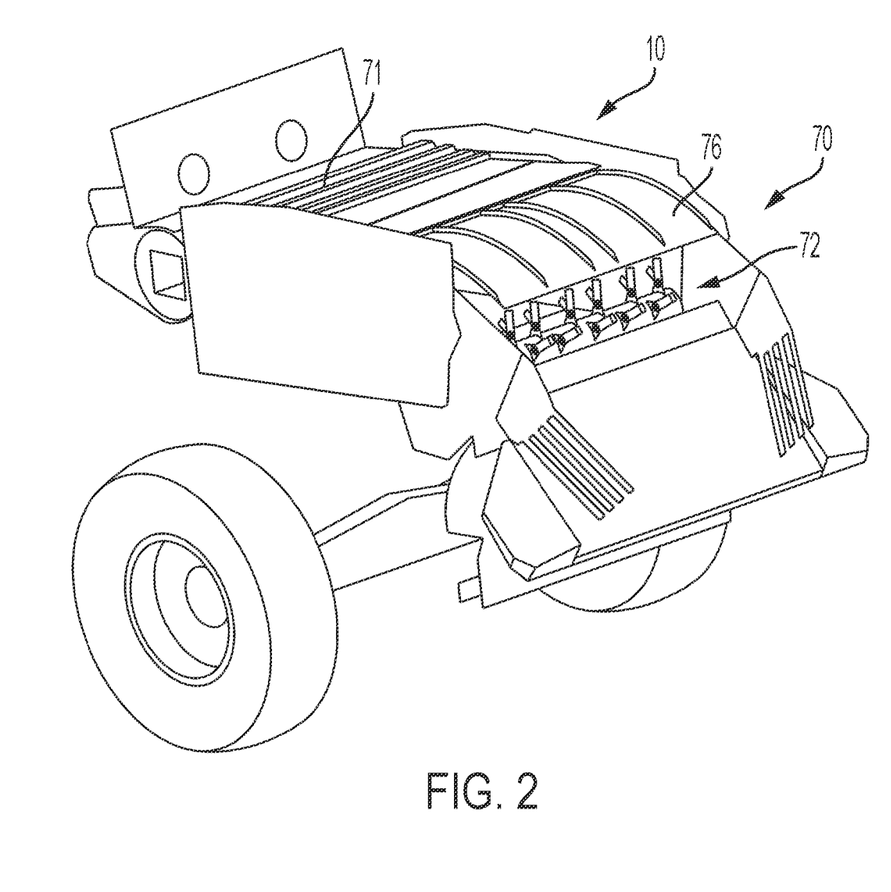
FIG. 2 is a rear perspective view of some of the components of the combine of FIG. 1 showing further details of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Motive force is selectively applied to the front wheels 14 through a power plant in the form of a diesel engine 32 and a transmission (not shown). Both the front and rear wheels 14 and 16 may be steerable.

The header 18 is mounted to the front of the combine 10 and includes a cutter bar 34 for severing crops from a field during forward motion of combine 10. A rotatable reel 36 feeds the crop into the header 18, and a double auger 38 feeds the severed crop laterally inwardly from each side toward the feeder housing 20. The feeder housing 20 conveys the cut crop to threshing and the separating system 24.

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including seeds, particles lighter than grain, such as chaff, dust and straw, are discharged through perforations of the concave 42.

Grain that has been separated by the threshing and separating assembly 24 falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52, which provides an airflow through the sieves, to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of the lower sieve 50. The clean grain auger 56 receives clean grain from each sieve 48, 50 and from bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

Referring now to FIGS. 2-5, straw hood 54 comprises a top wall 71 and a bottom wall 67. Side walls 55 interconnect the walls 71 and 67. A straw passageway 69 is defined between the walls 71 and 67. Crop residue from the cleaning system 26 and threshing system 24 is delivered into straw hood 54, and is processed by a residue handling system 70. Residue handling system 70 generally comprises a discharge beater 75, seed mills 77a and 77b (referred to either individually or collectively as seed mill(s) 77), a chopper 72, and horizontally oriented spreaders 74. Chopper 72 includes projecting elements 73 in the form of blades or paddles on its outer circumference that are configured to chop straw. Chopper 72 is driven by a shaft 82 having a pulley 86 at its end, and pulley 86 is driven by a belt 88 that is driven by engine 32 of the combine 10. Further details of discharge beater 75, chopper 72 and spreaders 74 are provided in the '232 Patent.

Figure 5:
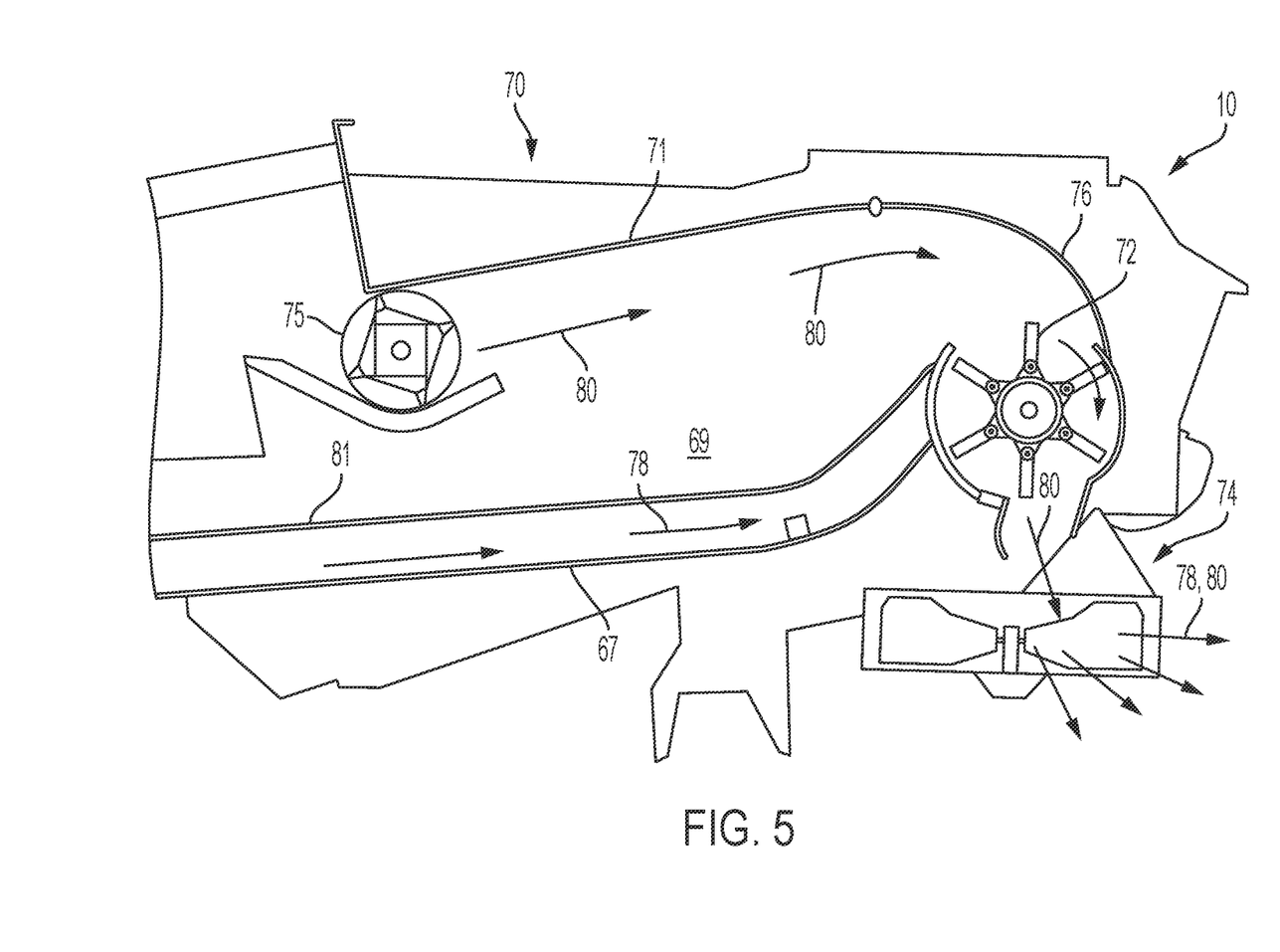
FIG. 5 is a cross-sectional view of the rear end of the combine of FIG. 3 taken along the lines 5-5 showing the straw chopper section of the residue handling system.

Turning now to the flow of straw through the residue handling system 70, as best shown in FIG. 5, discharge beater 75 delivers a stream 80 of straw material (emanating from threshing system 24) into a straw passageway 69 of straw hood 54 to chopper 72. Chopper 72 rotates and chops the straw material and delivers it to spreaders 74. Each spreader 74 discharges the stream 80 of straw material across the harvested width behind harvester 10.

Figure 4:
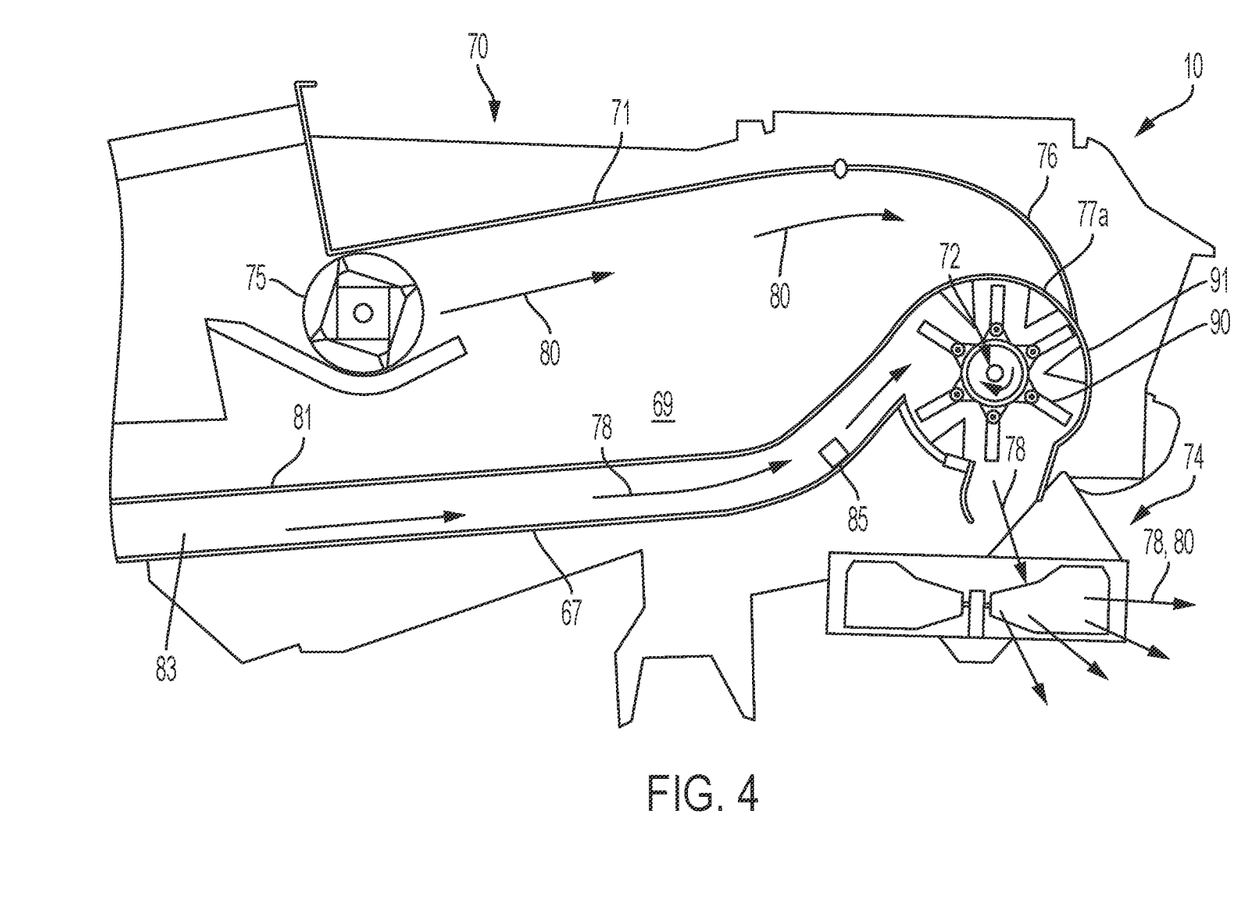
FIG. 4 is a cross-sectional view of the rear end of the combine of FIG. 3 taken along the lines 4-4 showing one seed mill section of the residue handling system.

A windrow mode selection door 76 is mounted to the top wall 71 at a location above the chopper 72 and pivots between two positions, a deployed (i.e., extended) position and a retracted position shown in FIG. 4. In the deployed position, the first stream 80 of residue (straw), which is discharged from the discharge beater 75, is diverted over top of the chopper 72 (i.e., bypassing chopper 72), through the windrow outlet of the machine 10 and onto a hood or chute (see FIG. 5) that guides the residue to form a windrow behind the combine 10. In the retracted position of door 76 shown in FIG. 4, the door 76 prevents the stream 80 of residue from passing through the windrow outlet. And, the stream 80 is directed to the chopper 72.

Turning now to the flow of chaff through the residue handling system 70, as best shown in FIGS. 4 and 5, two conduits 81 (one shown) are positioned in the straw hood 54. Conduits 81 may be tubes, or passageways formed in sheet metal plates, for example. Each conduit 81 provides a chaff passageway 83. A device 85, such as a blower, auger, or aspirator, is (optionally) positioned within chaff passageway 83 for delivering a stream 78 of chaff from cleaning system 26 into seed mills 70. Chaff stream 78 travels within chaff passageway 83 and into the seed mills 77. It is noted that although a conduit 81 is shown in FIG. 5, it should be understood that conduit 81 does not communicate with chopper 72—conduit 81 only communicates with seed mills 77.

Once chaff stream 78 enters the seeds mills 77, the seed mills 77 damage the seeds in the chaff stream 78 to prevent germination, and, thereafter, output the chaff stream 78 to the spreaders 74. The spreaders 74 receive and output both the chaff stream 78 and straw stream 80. Further details in connection with the seed mills 77 are provided in the next paragraph.

Figure 3:
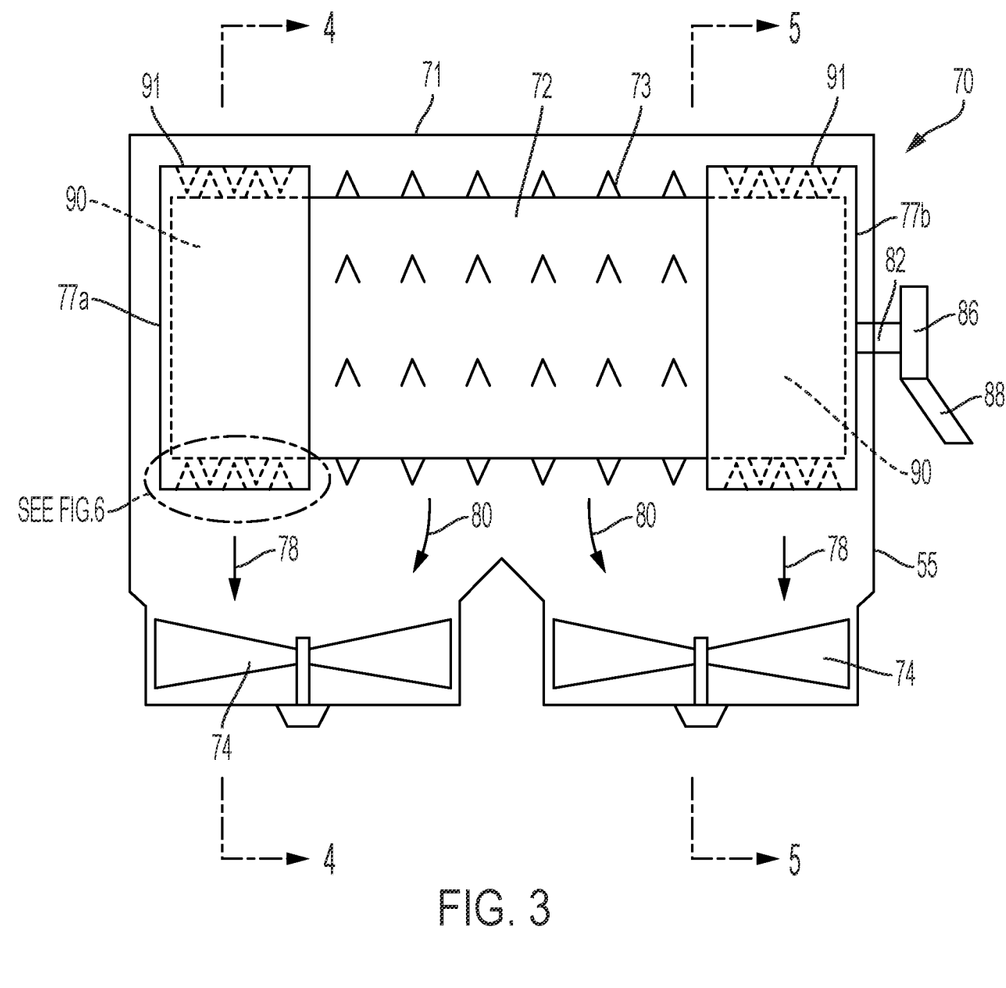
FIG. 3 is a schematic rear elevation view of the combine of FIG. 1 showing a residue handling system.
Figure 6:
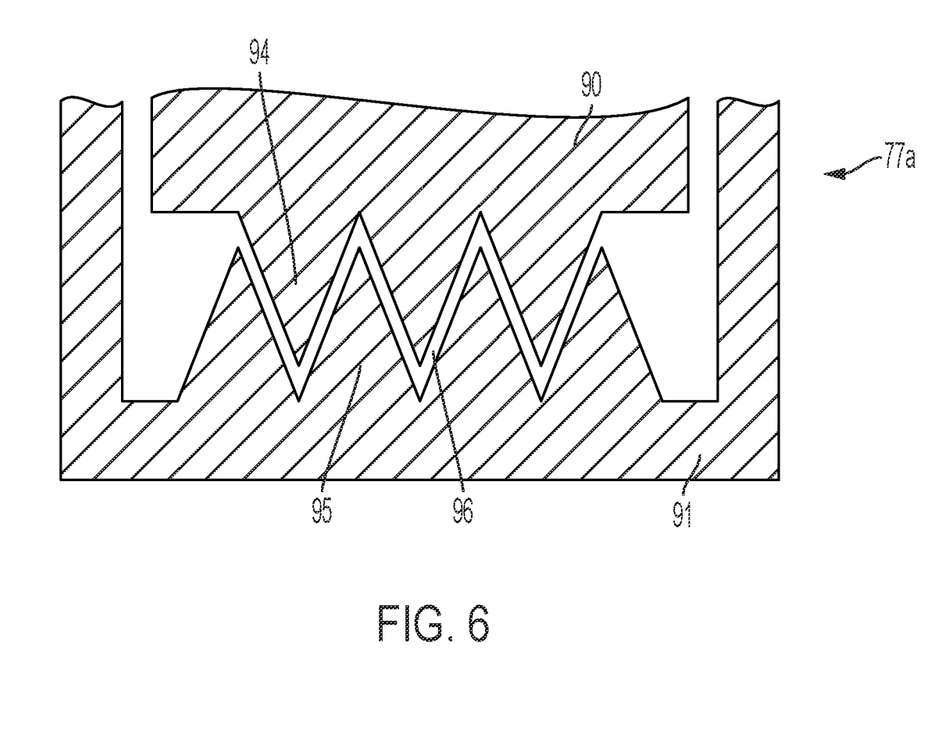
FIG. 6 is a detailed cross-sectional view of the seed mill shown in FIG. 3.

Turning now to FIGS. 3, 4 and 6, one seed mill 77 is positioned at each end of the chopper 72 (i.e., a total of two seed mills 77). Each seed mill 77 includes a rotatable rotor portion 90 and a stationary concave portion 91 surrounding the rotatable rotor portion 90. The rotor portions 90 are cylindrical bodies that are connected to chopper 72 such that rotor portions 90 rotate together along with chopper 72. The axes of rotation of rotor portion 90 and chopper 72 are both oriented transversely and aligned. Rotor portions 90 may be unitized with chopper 72 or they may be separate components that are non-rotatably connected to chopper 72. It should be understood that rotor portions 90 are driven by shaft 82 (FIG. 3). Although two seed mills 77 are shown and described herein, it should be understood that only one seed mill 77 may be mounted to chopper 72, and seed mill 77 may be positioned on either one end or in the center of chopper 72.

As best shown in FIG. 6, a series of protruding blades 94 extend outwardly from the outer perimeter of each rotor portion 90. Each concave portion 91 includes a hollow region and a revolved annular outer wall. The concave portion 91 may be mounted directly to the shroud that surrounds the chopper 72. A series of blades 95 extend inwardly from the interior facing surface of the annular outer wall of the concave portion 91. Blades 94 and 95 are interleaved with each other, and are separated by a clearance 96. Adjacent blades 94 and 95 do not contact each other. The clearance 96 between blades 94 and 95 is sufficiently small so as to be less than the diameter of seeds encountered in the chaff stream. The tight clearance allows the opposing surfaces of the blades 94 and 95 to impart shear stresses to seeds passing through seed mill 77 as rotor portion 90 rotates in stationary concave portion 91. Rotor portion 90 and chopper 72 rotate together at the same speed, which is sufficient to damage the seeds and prevent their germination. Concave portion 91 includes an outlet through which the processed chaff is delivered to the spreaders 74.

The seed mills 77 may vary from that which is shown and described herein. For example, the way in which the seeds are destroyed is not limited to that which is shown and described herein. The seeds can be damaged by shearing, crushing, impact, or a combination thereof. Seed mills 77 may incorporate knifes, hammers, cages or mills. Seed mills 77 may be eccentric or coaxial. Both seed mills 77 can rotate, or only one seed mill 77 may rotate. The blades 94 and 95 may vary from that shown herein. Blades 95 on the concave may be replaced by impact surfaces and the sharp triangular blades 94 may be replaced by fan-type blades, such as shown in U.S. Pat. No. 10,004,176 (the '176 Patent), which is incorporated by reference in its entirety. Also, the concave could rotate, if so desired. Further details and alternative designs relating to the rotor (or drum), concave and clearances are described in the '232 and '176 Patents.

While this invention has been described with respect to at least one embodiment, the present invention can be further modified within the spirit and scope of this disclosure. For example, while the invention has been described herein for use with a rotary combine, it should be understood that the invention may also be implemented in conventional and cross harvester combines. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A residue handling system for an agricultural harvester, said residue handling system comprising:
    a chopper that is positionable within a straw hood of the combine harvester, said chopper having projecting elements for chopping straw within the straw hood as the chopper rotates; and
    a seed mill that is mounted directly to the chopper, said seed mill comprising a rotatable rotor that is at least partially positioned within a concave, said rotor and said chopper being connected to rotate together about a common axis of rotation,
    wherein the rotor and the concave include interleaved projecting blades extending orthogonal to the common axis, wherein the interleaved projection blades of the rotor and the concave are spaced apart along the common axis, and wherein a clearance between adjacent interleaved projecting blades is smaller than a diameter of a weed seed.

2. The residue handling system of claim 1, wherein the rotor and the chopper form a unitary structure.

3. The residue handling system of claim 1, wherein the rotor includes projecting elements for contacting seeds entering the seed mill.

4. The residue handling system of claim 1, wherein the seed mill is positioned on an end of the chopper.

5. The residue handling system of claim 1, wherein the seed mill and the chopper are not connected together by a belt, and the seed mill is not powered by hydraulic power.

6. The residue handling system of claim 1, further comprising a second seed mill, wherein the seed mills are positioned on opposite ends of the chopper.

7. The residue handling system of claim 1, wherein the axes of rotation of the rotor and the chopper are aligned and oriented transversely.

8. The residue handling system of claim 1 further comprising a hollow conduit extending between a cleaning section of the agricultural harvester and an inlet of the seed mill.

9. The residue handling system of claim 1 further comprising a crop spreader positioned downstream of both the seed mill and the chopper for receiving crop material from both the seed mill and the chopper.

10. The residue handling system of claim 1, wherein the chopper and the rotor each rotate at a speed of between 100 rpm and 500 rpm, which is sufficient to damage weed seeds and prevent their germination.

11. The residue handling system of claim 1, wherein the seed mill receives a stream of chaff from a cleaning section of the agricultural harvester, and the chopper receives a separate stream of straw from a threshing section of the agricultural harvester.

12. The residue handling system of claim 1, wherein the rotor and the chopper are driven by the same shaft that is configured to be indirectly connected to an engine of the agricultural harvester.

13. The residue handling system of claim 1, wherein the concave is stationary and is positioned over a portion of the chopper.

14. An agricultural harvester comprising the residue handling system of claim 1.

15. The residue handling system of claim 1, wherein each projecting blade terminates at a sharp tip.

16. The residue handling system of claim 15, wherein the sharp tip of each projecting blade of one of the rotor and the concave is positioned between sharp tips of two projecting blades of the other of the rotor and the concave.

17. The residue handling system of claim 1, wherein, as viewed in cross-section, each projecting blade has a triangular shape.

18. The residue handling system of claim 1, wherein the clearance between adjacent interleaved projecting blades remains constant over an entirety of the seed mill.

19. The residue handling system of claim 9, wherein the spreader is positioned beneath the concave.

20. The residue handling system of claim 1, wherein a diameter of the chopper is equal to a diameter of the rotor.

\* \* \* \* \*